(12) United States Patent
Hanatani

(10) Patent No.: US 6,595,894 B2
(45) Date of Patent: Jul. 22, 2003

(54) SHIFT CONTROL DEVICE

(75) Inventor: Masahiro Hanatani, Spanish Village (SG)

(73) Assignee: Shimano (Singapore) Private Limited (SG)

(*) Notice: Subject to any disclaimer, the term of this patent is extended or adjusted under 35 U.S.C. 154(b) by 0 days.

(21) Appl. No.: 09/802,764

(22) Filed: Mar. 9, 2001

(65) Prior Publication Data

US 2002/0128112 A1 Sep. 12, 2002

(51) Int. Cl.[7] .............................. F16H 57/08; F16C 1/10
(52) U.S. Cl. ...................................... 475/349; 74/502.2
(58) Field of Search ........................... 475/331, 349; 74/473.13, 473.14, 473.15, 473.22, 473.25, 489, 491, 502.2; B62K 23/04

(56) References Cited

U.S. PATENT DOCUMENTS

| | | | | |
|---|---|---|---|---|
| 3,524,979 A | * | 8/1970 | Cohen ........................... | 74/489 |
| 3,633,437 A | | 1/1972 | Ishida .......................... | 74/489 |
| 3,665,775 A | | 5/1972 | Freeman ...................... | 74/473 |
| 3,701,546 A | * | 10/1972 | Schwerdhofer et al. ....... | 74/489 |
| 3,874,248 A | | 4/1975 | Hauser et al. ................ | 74/475 |
| 4,352,303 A | * | 10/1982 | Christner .................... | 74/489 |
| 5,102,372 A | | 4/1992 | Patterson .................... | 474/80 |
| 5,197,927 A | | 3/1993 | Patterson et al. ............. | 474/80 |
| 5,481,934 A | | 1/1996 | Tagawa ....................... | 74/475 |
| 5,524,501 A | | 6/1996 | Patterson et al. ............. | 74/475 |
| 5,588,925 A | | 12/1996 | Arbeiter et al. ............... | 474/81 |
| 5,662,000 A | | 9/1997 | Patterson et al. ............. | 74/475 |
| 5,666,859 A | | 9/1997 | Arbeiter et al. ............... | 74/489 |
| 5,673,594 A | | 10/1997 | Huang et al. ................. | 74/475 |
| 5,676,020 A | | 10/1997 | Jordan et al. ................. | 74/475 |
| 5,799,541 A | | 9/1998 | Arbeiter ...................... | 74/489 |
| 5,893,573 A | | 4/1999 | Arbeiter ...................... | 280/238 |
| 5,921,139 A | | 7/1999 | Yamane ..................... | 74/473.13 |
| 5,970,816 A | * | 10/1999 | Savard ........................ | 74/489 |
| 6,042,133 A | | 3/2000 | Leiter et al. ................ | 280/260 |
| 6,055,882 A | | 5/2000 | Arbeiter et al. ............... | 74/489 |
| 6,145,407 A | | 11/2000 | Rottmann .................. | 74/502.2 |

FOREIGN PATENT DOCUMENTS

| | | |
|---|---|---|
| DE | 27 10 391 | 9/1978 |
| DE | 3215427 | 10/1983 |
| DE | 40 26 058 A1 | 2/1992 |
| FR | 2.210.973 | 7/1974 |
| JP | 08 133161 A | 5/1996 |

* cited by examiner

Primary Examiner—Jack Lavinder
Assistant Examiner—Thomas J. Williams
(74) Attorney, Agent, or Firm—Jeffer, Mangels, Butler & Marmaro LLP

(57) ABSTRACT

A shift control device for a bicycle is disclosed having a planetary gear assembly for varying the relative angular position between an actuating member and a control member. In a preferred embodiment of the invention, the shift control device includes a control member engageable with a ring gear to drive a plurality of planetary gears about a fixed base member. The fixed base member preferably includes a sun gear integrally attached thereto. The planetary gears are preferably carried by an actuating member configured to pull and release a bicycle shift cable. Rotation of the planetary gears results in the tension or release of the bicycle shift cable. The shift control device can include a positioning mechanism for controlling the position of the actuating member relative the base member.

56 Claims, 11 Drawing Sheets

SHIFT CONTROL DEVICE

FIELD OF THE INVENTION

The present invention relates generally to shift control device for a bicycle, and more particularly, to a twist-grip shift control device for shifting a bicycle transmission having a planetary gear mechanism for varying the relative angular position between an actuating member and a base member.

BACKGROUND OF THE INVENTION

Generally, bicycle riders prefer a shift control device that is easy to function and requires little force to operate.

The conventional twist-grip type shift control device includes a cable winding member operatively engaged with a control grip rotatably mounted on the handlebar of the bicycle. In the conventional twist-grip shift control device, the ratio of rotational angle between the control grip and the winding member is 1:1. There have been attempts to decrease the operational force of the known twist-grip shift control devices by decreasing the diameter of the winding member. However, because the winding member of the known devices are installed coaxially with respect to the handlebar, it is not possible to have a winding member with a diameter that is smaller than the diameter of the handlebar.

The operational force may also be decreased by enlarging the diameter of the control grip. However, this type of engineering design is limited by the anatomical features of the human hand. An oversized control grip is ergonomically disfavored, especially for a bicycle rider having small hands. Additionally, the aesthetic appearance of a control grip is negatively impacted by an enlarged control grip. An increase in size of the control grip corresponds to an increase in weight of the shift control device, which is a disadvantage when it is desirable to minimize the weight of a bicycle and its components.

Accordingly, it is desirable to provide a shift control device that includes a gear mechanism for controlling the ratio of the rotational angle between the control grip and the winding member.

SUMMARY OF THE PREFERRED EMBODIMENTS

The present invention is directed to a twist-grip shifting device that avoids the large forces required to operate prior art twist-grip shifting devices.

A shift control device for a bicycle is disclosed having a planetary gear assembly for varying the relative angular position between an actuating member and a control member. In a preferred embodiment of the invention, the shift control device includes a control member engageable with a ring gear to drive a plurality of planetary gears about a fixed base member. The fixed base member preferably includes a sun gear integrally attached thereto. The planetary gears are preferably carried by an actuating member configured to pull and release a bicycle shift cable. Rotation of the planetary gears results in the tension or release of the bicycle shift cable. The shift control device can include a positioning mechanism for controlling the position of the actuating member relative the base member.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
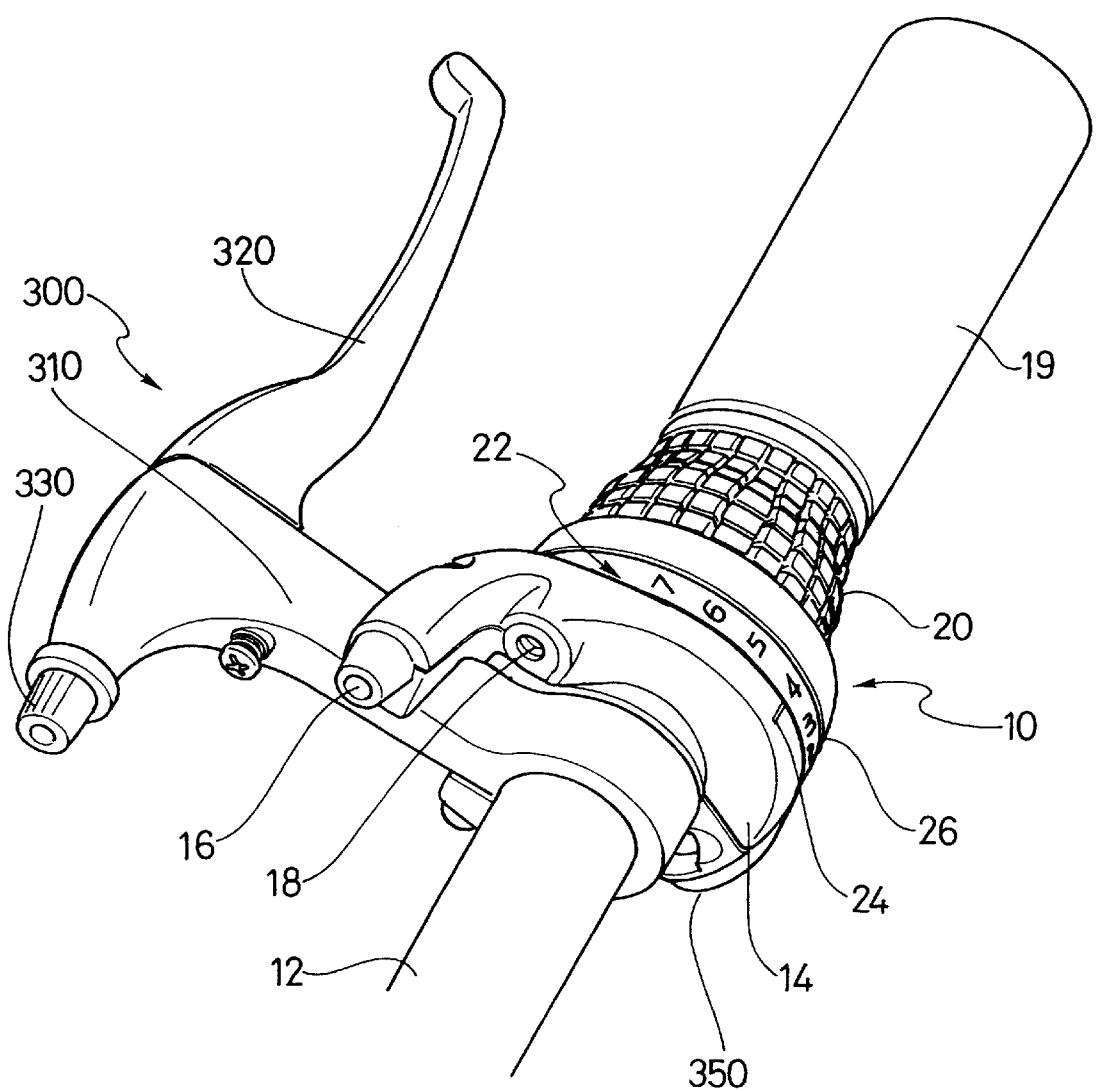
FIG. 1 is a perspective view of a bicycle handlebar having the shift control device of the present invention installed thereon.

FIG. 1 depicts a preferred embodiment of the shift control device 10 of the present invention, as installed on the handlebar 12 of a bicycle. The shift control device 10 is preferably fixed to the handlebar 12 by a fixing band disposed in a shifter bracket 14. As will be described in further detail below, the shift control device 10 is configured to manipulate a winding member in order to take up or pay out a transmission control cable.

As shown in FIG. 1, the shift control device 10 includes a first channel 16 for receiving a transmission control cable, the first channel 16 being in communication with the winding member (not shown). In a preferred embodiment of the invention, the shift control device is also configured to manipulate a second control cable for an indicator, in addition to the transmission control cable. In this regard, the shift control device 10 includes a second channel 18 for receiving a second control cable, the second channel 18 also being in communication with the winding member.

The shift control device 10 preferably includes a fixed grip 19 that is fixedly attached to the handlebar 12 and a control grip cover 20 that is rotatable about the handlebar 12. The shift control device 10 is configured such that the rotation of the control grip cover 20 translates to a rotation of the winding member, as will be discussed in further detail below. By rotating the winding member, the shift control device 10 controls a derailleur via a transmission control cable in a manner known in the art.

To display the position of the shift gear, the shift control device 10 includes a shift gear position indicator 22 having a guide 24 and an indicator panel 26. In one embodiment of the invention, the guide 24 is fixed and the indicator panel 26 is rotatable relative to the handlebar 12. In another embodiment of the invention, the indicator panel 26 is fixed and the guide is rotatable relative to the handlebar 12. In either embodiment, such rotating element is preferably operatively associated with the winding member such that a rotation of the winding member translates to a corresponding rotation of the rotating element of the shift gear position indicator 22.

The shift control device 10 can be installed cooperatively with other control devices on the handlebar 12. For example, in the embodiment shown in FIG. 1, a brake control assembly 300 is connected on the handlebar 12 adjacent the shift control device 10. The brake control assembly 300 includes a brake lever 320, a brake lever bracket 310 connected to the handlebar 12 and a brake cable adjuster 330. The brake control assembly 300 is dimensioned to provide the bicycle rider with an ergonomically favorable access to the brake control assembly 300, as well as to the shift control device 10.

Additionally, a computer control switch 350, electrically connected to a bicycle computer (not shown), is preferably provided on the shifter bracket 14. As shown in FIG. 1, the computer control switch 350 is preferably located on the shifter bracket 14 at a location that is accessible by the thumb of the bicycle rider, when the rider is gripping the handlebar.

The structure of the shift control device 10 will now be described in detail. Although the description that follows refers to the shift control device 10 that is used to control the rear derailleur and that is attached to the right end portion of the bicycle handlebar 12, the same design of the shift control device can be provided on the left end of the handlebar with modification to the number of the gear positions. In a preferred embodiment, the shift control device for the front derailleur includes three gear positions, whereas the shift control device for the rear derailleur can have five, six, seven, eight or nine gear positions.

Each member of the shift control device 10 will now be described with reference to FIGS. 2 and 3. The grip cover 20 is preferably rotatable in two directions. Rotating the grip cover 20 in a first direction, designated as A in FIG. 2, causes the transmission control cable to be wound about a winding member. Rotating the grip cover 20 in a second direction, designated as B in FIG. 2, causes the transmission control cable to be released. The operation of the winding member will be discussed in further detail below.

The grip cover 20 preferably includes a textured surface 28 to provide frictional force between the bicycle rider's grip and the grip cover 20. The textured surface 28 shown in FIG. 2 includes a plurality of bumps thereon. However, the textured surface 28 of the present invention is not limited to the embodiment shown in FIG. 2 but can include any texture that facilitates the gripping of the cover 20.

The grip cover 20 is dimensioned to be fitted onto a control member 30. In a preferred embodiment of the invention, the grip cover 20 includes a plurality of guide grooves 32 that correspond to and are dimensioned to engage with protruding guides 34 on the control member 30. When the grip cover 20 is installed on the control member 30 and protruding guides 34 are positioned in the guide grooves 32, the grip cover 20 is securely fitted on the control member 30 and the rotation of the grip cover 20 is translated to the control member 30.

The shift control device of the present invention utilizes a planetary gear mechanism for varying the relative angular rotation of an actuating member 60. The planetary gear mechanism 40 includes a sun gear 42, a ring gear 44 and a plurality of planet gears 46. In a preferred embodiment of the invention, the sun gear includes 45 teeth, each of the planet gears include 14 teeth and the ring gear includes 75 teeth. The number of the teeth on the various gears can vary and this invention is not limited to gears having a specified number of teeth.

Figure 3:
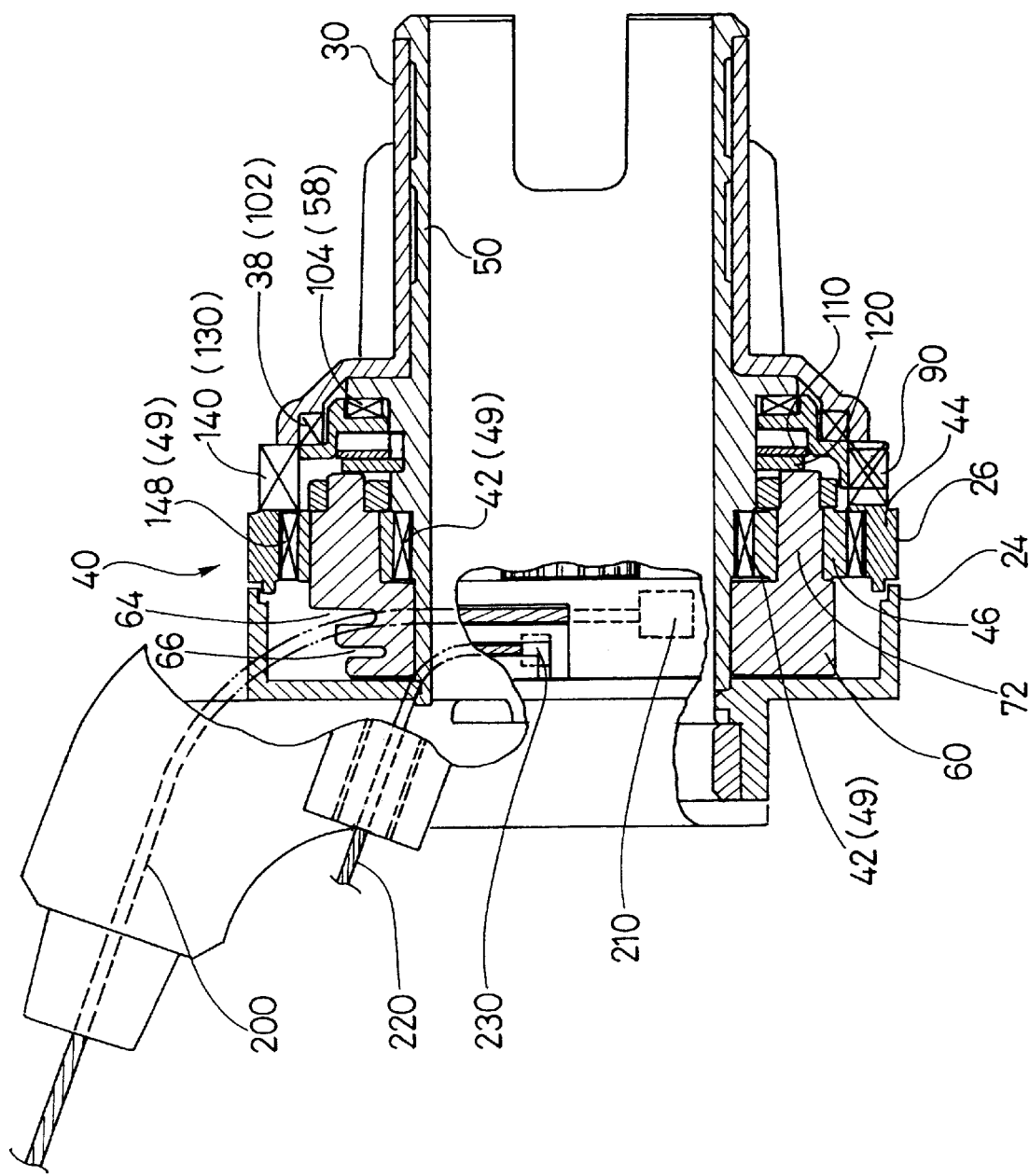
FIG. 3 is a cross-sectional view of a preferred embodiment of the shift control device of the present invention using an idler as a positioning mechanism.

In operation, as best shown in FIG. 3, the planet gears 46 are disposed between the sun gear 42 and the ring gear 44. The planet gears 46 are dimensioned to engage both the sun gear 42 and the ring gear 44 and to rotate relative to the sun gear 42. In a preferred embodiment, the planetary gear mechanism 40 includes three planet gears 46, and more preferably five planet gears 46.

The sun gear 42 is preferably integrally attached to a base member 50. In a preferred embodiment of the invention, the base member 50 is shaped as a long cylinder that is dimensioned to fit around the handlebar 12. During operation of the shift control device 10, the base member 50 is fixedly attached to the handlebar 12. The sun gear 42 and ring gear 44 are preferably installed coaxially with the handlebar 12 about axis X.

The configuration of the present invention provides improved stability as a result of the fixed attachment of the sun gear 42. The handlebar 12 of a typical bicycle has a diameter ranging from about 22.0 mm to about 22.2 mm. Because of the 0.2 mm variation in diameters of handlebars, it is not possible to ensure that a rotating member, as installed on the handlebar, would always rotate in a stable manner. For example, if the rotating member is configured by the manufacturer to fit on a handlebar having a diameter of 22.2 mm, then providing the rotatable member directly on a handlebar that varied slightly and had a 22.0 mm diameter would result in an unstable rotation of the rotatable member. An unstable rotation of the rotatable member results in an unstable gear engagement between the various components of the bicycle shift control device. Accordingly, it is not possible to ensure a stable gear engagement when a rotatable member is rotated directly on the handlebar.

In a preferred embodiment of the invention, one of the significant benefits is that a fixed sun gear 42 is integrally attached to a fixed base member 50, thus ensuring a stable sun gear 42 upon which the planet gears 46 can rotate. The variation in the diameter of the handlebar does not affect the fixed sun gear 42 and the sun gear will provide a stable base upon which a rotatable member can rotate regardless of the variation in the diameter of the handlebar 12. This design provides control over the tolerance of the sun gear 42, ring gear 44 and planet gears 46, which results in improved gear engagement performance.

In a preferred embodiment of the invention, the planet gears 46 are carried by an actuating member 60. Actuating member 60 preferably includes a winding member 62 integrally attached to a planet carrier 70. The planet carrier 70 includes a plurality of planet gear shafts 72, each planet gear shaft 72 dimensioned to receive a planet gear 46. During operation, each planet gear 46 rotates about a respective planet gear shaft 72.

Figures 5A, 5B:
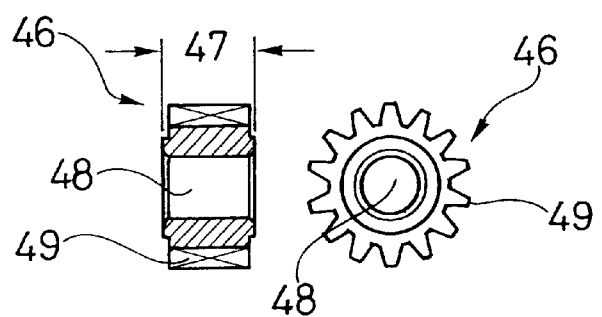
FIG. 5A is a cross-sectional side view of a planet gear of the present invention.
FIG. 5B is a top plan view of the planet gear of the present invention.

As best shown in FIG. 5A, each planet gear 46 has a gear height 47 and a center channel 48 dimensioned to receive a planet gear shaft 72. The gears 49 of the planet gear 46 extend radially outward from the circumference of the center channel 48 of the planet gear 46, as shown in FIG. 5B.

Figure 6A:
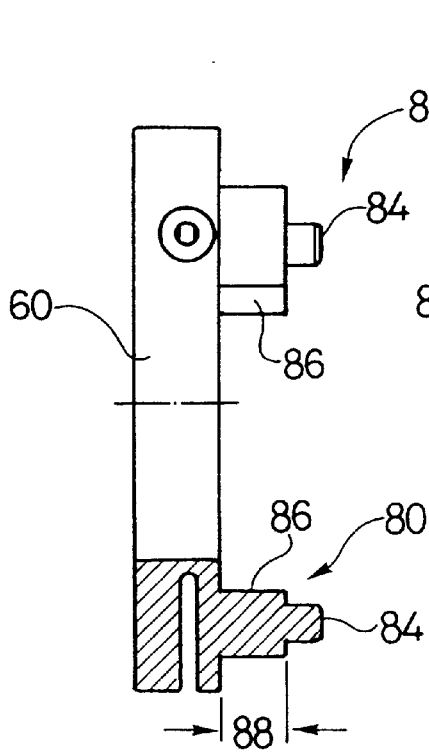
FIG. 6A is a partial cross-sectional side view of a preferred embodiment of the actuating member of the present invention.

In a preferred embodiment of the invention, as best shown in FIG. 6A, the planet gear shaft 72 includes a base portion 74 and a tip portion 76. When a planet gear 46 is installed on the planet gear shaft 72, the base portion 74 of the gear shaft 72 carries the planet gear 46. The height 78 of the base portion 74 of the planet gear shaft 72 is preferably slightly bigger than the height 47 of the planet gear 46 to ensure that the planet gear 46 rotates smoothly about the base portion 74 of the planet gear shaft 72. The tip portion 76 of the planet gear shaft 72 protrudes out of the planet gear 46, when the planet gear 46 is installed.

Figure 6B:
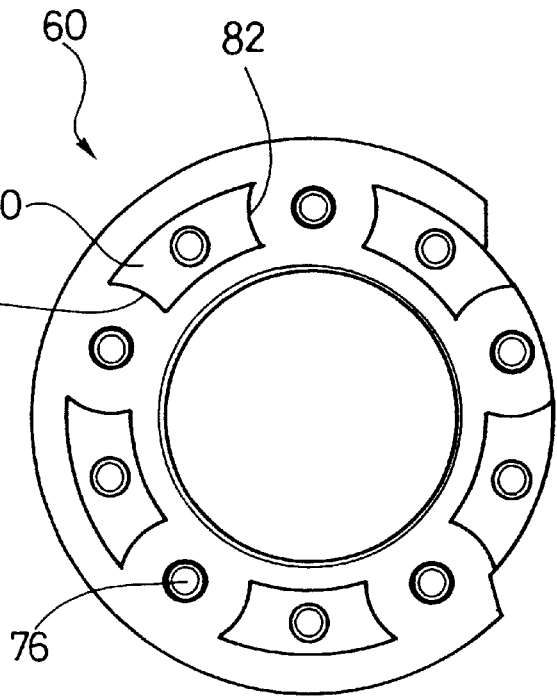
FIG. 6B is a top plan view of the actuating member shown in FIG. 6A.

The actuating member 60 preferably includes reinforced support panels 80, shown in FIGS. 6A and 6B, positioned between the planet gears 46, when the planet gears 46 are installed on the planet gear carrier 70. The reinforced support panels 80 preferably includes a base portion 86 having curved edges 82 that correspond to the curvature of the planet gear 46. The reinforced support panels 80 ensure space for planet gears 46 in the axial direction (in conjunction with the gear plate 90, as discussed below) and in the circumferential direction with laterally disposed curved edges 82.

Figure 7:
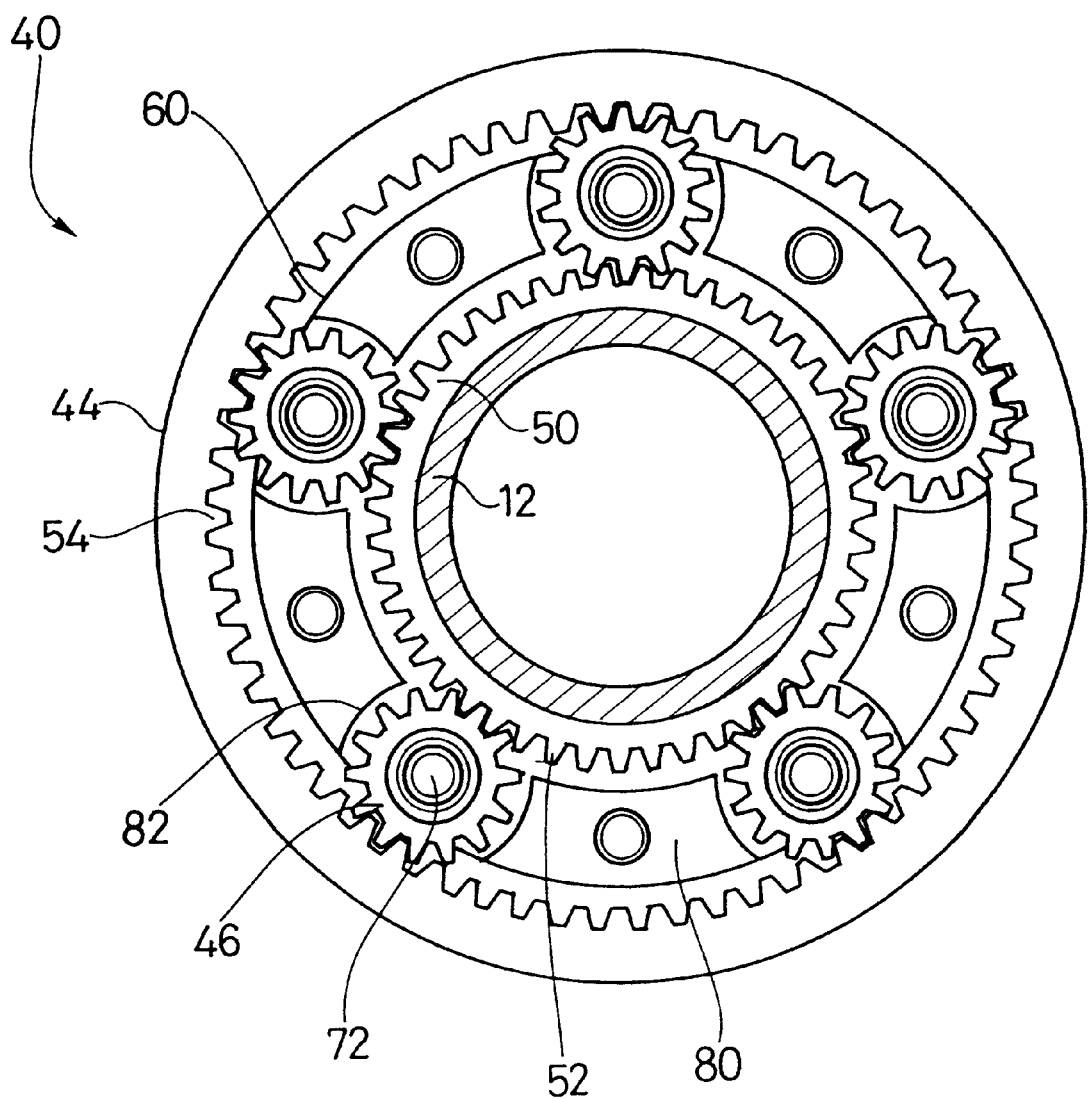
FIG. 7 is a top plan view of a preferred embodiment of the planetary gear mechanism of the present invention.

The height 88 of the base portion 86 is preferably equal to the height 78 of the base portion 74 of the planet gear shaft 72. A protruding tip 84 preferably extends from the reinforced support panel 80 in the same direction as the tip portion 76 of the planet gear shaft 72. The interaction of the components of the planetary gear mechanism 40 is illustrated in FIG. 7. In a preferred embodiment of the invention, the base member 50, actuating member 60 and ring gear 44 are coaxially installed on the bicycle handlebar 12. The base member 50 is fixedly attached to the handlebar 12 and preferably does not rotate during the operation of the planetary gear mechanism. The sun gear 42 is integrally formed on the base member 50 and includes gears 52 extending radially outward from the sun gear 42.

Each planet gear 46 is positioned between the sun gear 42 and the ring gear 44 such that the gears 49 of the planet gear 46 mesh with the gears 52 of the sun gear 42 and the gears 54 of the ring gear 44. The reinforced support panels 80 of the actuating member 60 ensure smooth operation of the planetary gear mechanism 40 by ensuring space for planet gears 46 in the axial direction and in the circumferential direction. The curved edge 82 of the reinforced support panel 80 is positioned in close proximity to the planet gear 46 without interfering with the rotation of the planet gear 46.

The planetary gear mechanism 40 is set in motion by rotation of the ring gear 44. When the ring gear 44 is rotated, each planet gear 46 rotates about a respective planet gear shaft 72. As each planet gear 46 rotates, the planet gears 46 revolve around the sun gear 44. Because the planet gear shafts 72 are integrally attached to the actuating member 60, the revolution of the planet gears 46 about the sun gear 42 causes the actuating member 60 to rotate about the sun gear 42 as well.

Figure 2:
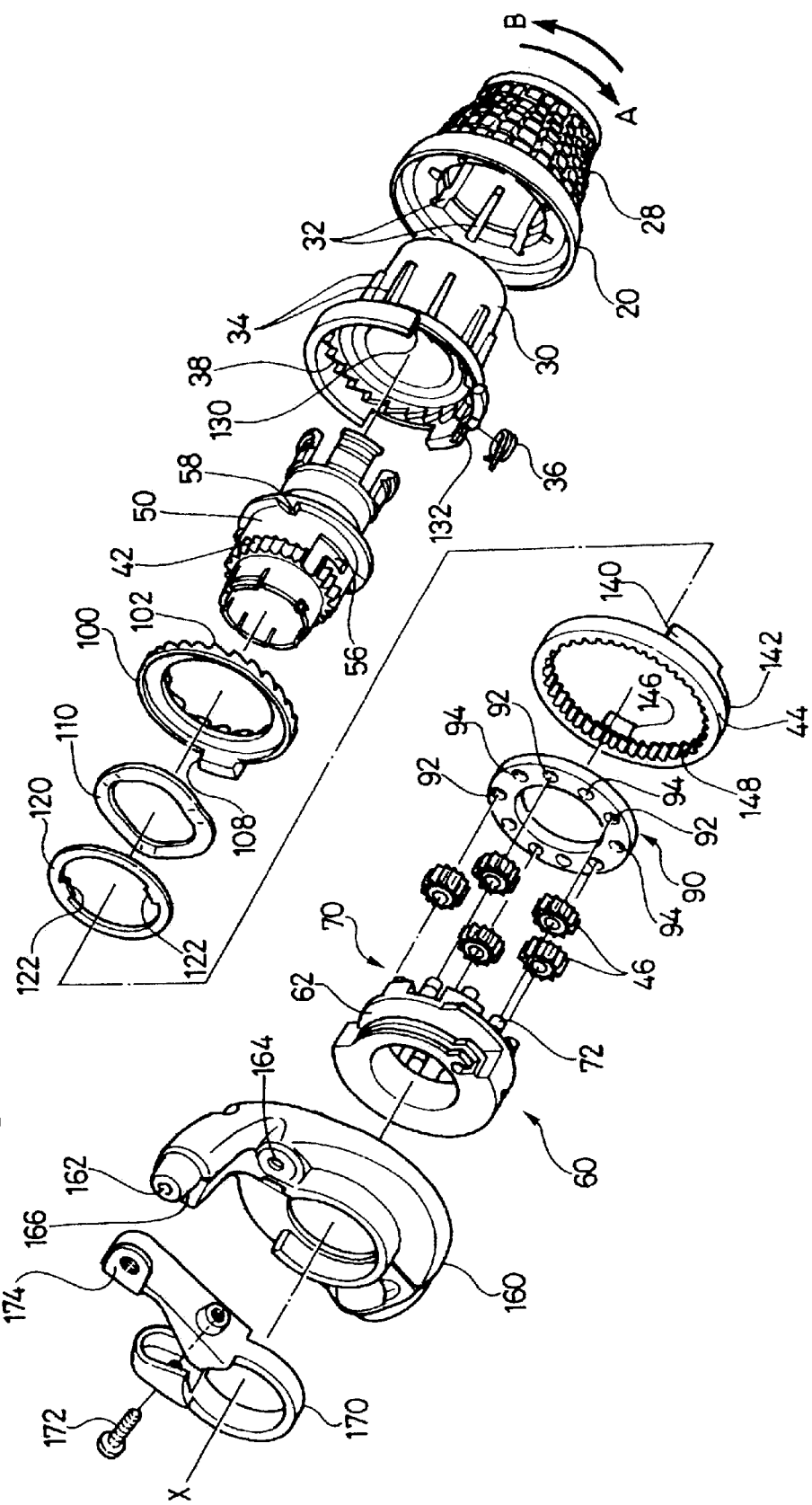
FIG. 2 is an exploded view of a preferred embodiment of shift control device of the present invention using an idler as a positioning mechanism.

In the preferred embodiment of the invention, a gear plate 90, best shown in FIG. 2, is provided to ensure that the planet gears 46 are securely retained on the planet gear shafts 72. The gear plate 90 includes a plurality of apertures 92, each aperture 92 dimensioned to receive the tip portion 76 of a planet gear shaft 72. Even more preferably, the gear plate includes additional apertures 94 dimensioned to receive the tip portion 84 of the support panel 80. The gear plate 90 is installed on the actuating member 60 in a manner that secures the planet gears 46 between the actuating member 60 and the gear plate 90.

Figure 9:
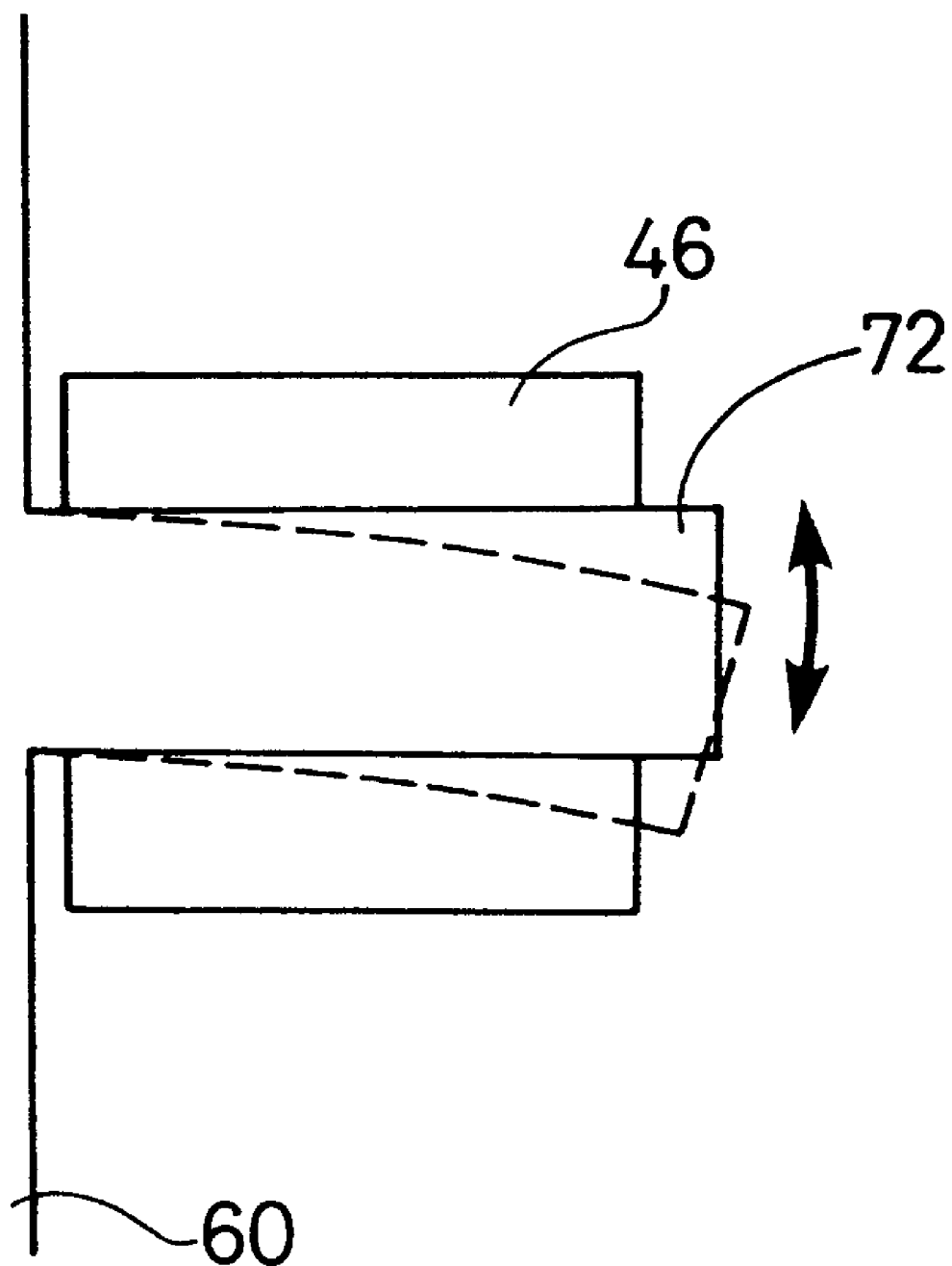
FIG. 9 depicts the deformation of a planetary gear shaft that is not supported by a gear plate.

In a preferred embodiment of the invention, one significant benefit of the gear plate 90 is that the gear plate prevents the planet gear shafts 72 from being bent or inclined during operation. As shown in FIG. 9, if the planet gear shafts 72 are not supported by a gear plate 90, it is possible that the gear shafts 72 will bend or deform during the operation of the planetary gear mechanism. The gear plate 90 fixes the relative axial distance between the planet gear shafts 72, thus preventing the deformation of the planet gear shafts 72 during operation.

Another significant benefit, in a preferred embodiment of the invention, is that the distance between the planet gear shafts 72, and thus between the planet gears 46, remains constant by using the gear plate 90 in combination with the reinforced support panels 80. This features is especially advantageous when the sun gear 42, ring gear 44, and planet gears 46 are made of resin or other deformable material.

Figure 8:
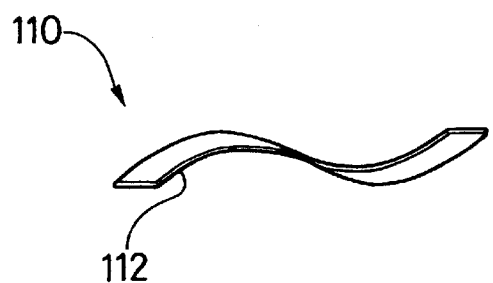
FIG. 8 is a side cross-sectional view of the wave washer used to bias the idler toward the control member.

As best shown in FIG. 2, a positioning mechanism or idler 100 is provided to control the position of the control member 30 relative to the base member 50. In a preferred embodiment of the invention, the positioning mechanism 100 is provided between the control member 30 and the planetary gear mechanism 40. The idler 100 is preferably positioned coaxially about the base member 50 and configured to rotate about the base member 50. To bias the idler 100 toward the control member 30, a wave washer 110 and a stop plate 120 are mounted coaxially on the base member 50. The wave washer 110 is adjacent to and in contact with the idler 100. As shown in FIG. 8, the wave washer 110 has a wavelike or s-shaped cross-section 112 and is preferably made of a resilient material that provides sufficient force to bias the idler 100 toward the control member 30. The stop plate 120 prevents the wave washer 110 from moving axially on the base member 50 such that it is no longer in contact with the idler 100.

The stop plate 120 preferably includes mounting notches 122 that engage L-shaped grooves 56 on the base member 50. When the notches 122 are coupled to the L-shaped grooves 56, the stop plate 120 is secured to the base member 50 such that the stop plate 120 does not move in the axial direction. The stop plate 120 is positioned on the base member such that the stop plate 120 limits the axial movement of the wave washer 110 to the area between the idler 100 and the stop plate 120. The engagement of the stop plate 120 to the base member 50 is not limited to the notch-groove assembly. Rather, the stop plate 120 can be secured to the fixed member 50 in any known manner. Additionally, other known biasing devices can be used in place of the wave washer 110 to bias the idler 100 toward the control member 30.

Figure 10:
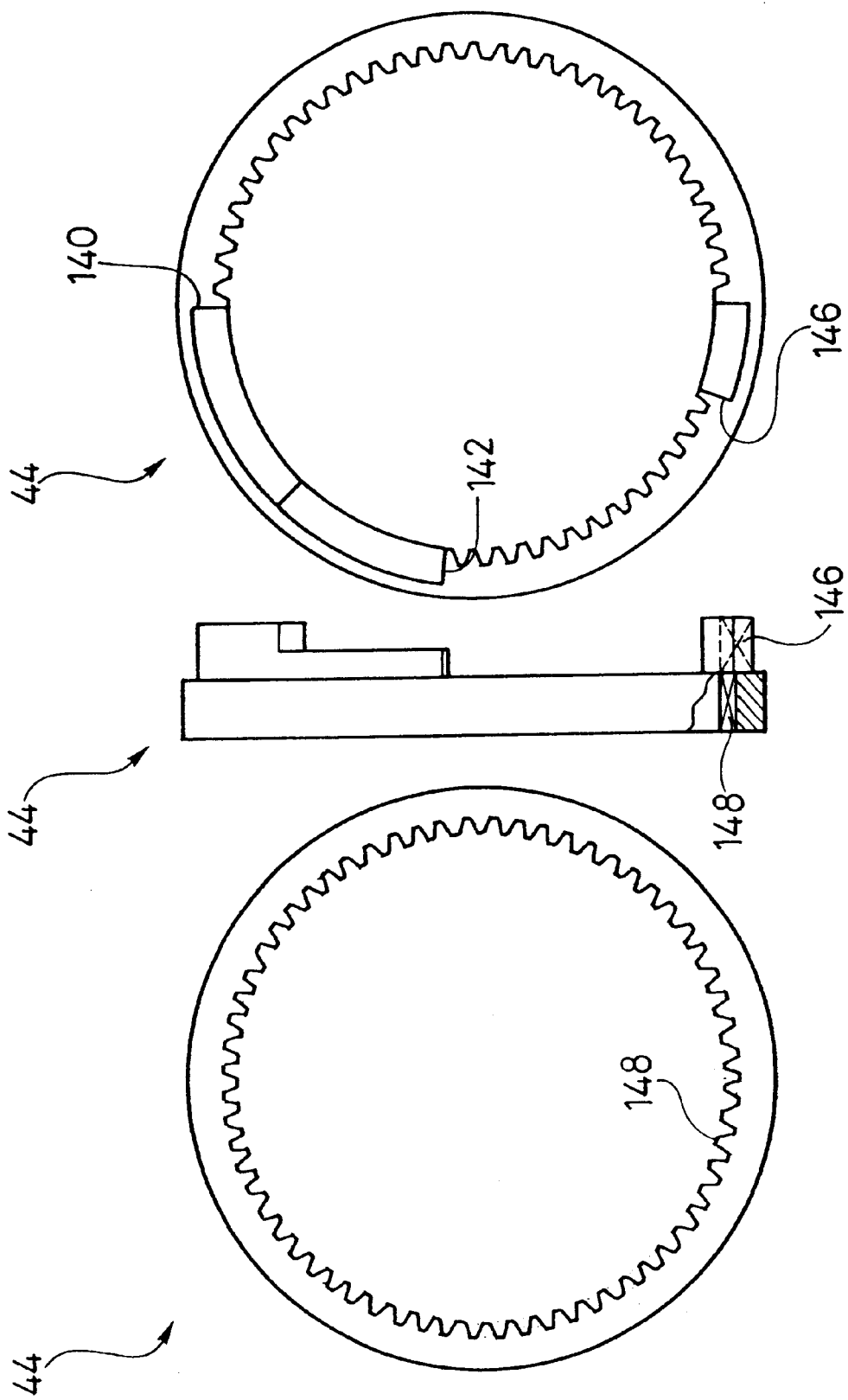
FIG. 10 illustrates the back, side and front view of a ring gear of a preferred embodiment of the present invention.

With reference to FIGS. 2, 3 and 10, the interaction between the components of the shift control device is described. In a preferred embodiment of the invention, the control member 30 drives the ring gear 44. The ring gear 44, as shown in FIG. 10 includes a first ring gear abutment 140 that contacts a first abutment 130 on the control member 30 when the control member 30 is actuated in a winding direction. The engagement of the first abutment 130 on the control member 30 with the first abutment 140 on the ring gear 44 causes the ring gear 44 to rotate in the same direction as the control member 30.

When the control member 30 is actuated in a release direction, a spring 36 positioned between the second abutment 132 on the control member 30 and the second abutment 142 on the ring gear 44 biases the ring gear 44 in the release direction. The invention is not limited to the use of a spring 36 but can include any known biasing device capable of biasing the ring gear in a release direction.

In a preferred embodiment of the invention, the ring gear 44 includes a third abutment 146 that is engageable with an abutment 108 on the idler when the ring gear 44 is rotated in the release direction, B. Therefore, when the ring gear 44 is biased in the release direction, idler 100 is biased in the release direction, too.

The ring gear 44 includes a plurality of gears 148 extending radially inward from the circumference of the ring gear 44. The gears 148 of the ring gear 44 engage the gears 49 of the planet gears 46 and rotate the planet gears 46 about the sun gear 42. Because the planet gear shafts 72 are integrally attached to the actuating member 60, the actuating member rotates about the sun gear 42 with the planet gears 46.

As discussed above, the actuating member 60 includes a winding member 62 integrally attached thereto. As best shown in FIG. 3, the winding cable includes a first groove 64 therein for receiving the transmission control cable 200. The transmission control cable 200 is preferably installed on the winding member by a cable connector 210. During operation of the shift control device 10, the transmission control cable 200 is either wound on the winding member 62 or unwound from the winding member 62, depending on the direction of operation of the control member 30.

In a preferred embodiment of the invention, the winding member 62 includes a second groove 66 for receiving a second control cable 220. The second control cable 220 could be a control cable for a second indicator device or a cable for another control device. A cable connector 230 attaches one end of the second control cable 220 to the winding member 62. During operation of the shift control device 10, the second control cable 220 is either wound on the winding member 62 or unwound from the winding member 62, depending on the direction of operation of the control member 30.

Accordingly, the operation of the control member 30, eventually results in the takeup or release of a control cable. In a preferred embodiment of the invention, the winding member 62 and the first and second grooves 64, 66 are circular, having a constant radius. When the winding member 62, the first groove 64 and the second groove 66 are circular, the rotation of the control member 30 is directly proportional to the pull or the release of the control cable. The pulling ratio and the releasing ratio are therefore constant.

In another preferred embodiment, the winding member 62 and the first and second grooves 64, 66 are cam-shaped. When the winding member 62, the first groove 64 and the second groove 66 are cam-shaped, the rotation of the control member 30 is not directly proportional to the pull or the release of the control cable. The pulling ratio and the releasing ratio are variable. This design can be manipulated to obtain more control of the pull or release of the control cable depending on the application.

In a preferred embodiment of the invention, the ratio of the angular rotation of the control member 30 to the winding member 62 is 1:0.625. The ratio of angular rotation is calculated using known gear ratio formulas, as discussed in further detail below.

$\phi_1 = 360 \times (N/N_s)$ $\phi_2 = 360 \times (N/N_r)$ $\phi_3 = \phi_1 + \phi_2$ $\phi_1/\phi_3 = N_r/(N_r + N_s)$ where, $\phi_1$ is the angle of rotation of the planet gear on the sungear;

$\phi_2$ is the angle of rotation of the ring gear which drives the planet gear;

$\phi_3$ is the angle by which the ring gear is rotated;

N is the number of gears disengaged between the ring gear and the planet gear;

$N_s$ is the number of gears on the sun gear; and $N_r$ is the number of gears on the ring gear.

In a preferred embodiment of the invention, there are seventy five gears on the ring gear 44, forty five gears on the sun gear 42 and fourteen gears on each of the planet gears 46. Accordingly, for this embodiment, the ratio ($\phi_1/\phi_3$) of the angular rotation of the control member 30 to the winding member 62 is 0.625.

Figure 11:
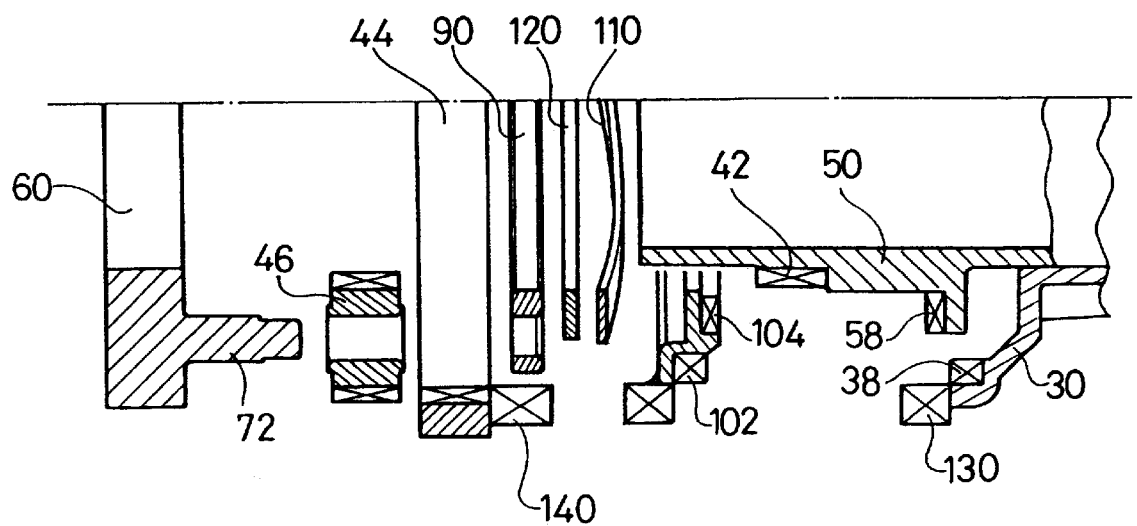
FIG. 11 is a partially exploded side view of a preferred embodiment of the shift control device of the present invention.

A positioning mechanism is used to control the angular rotation of the control member 30 relative to the base member 50. In one embodiment of the invention, the positioning mechanism is an idler. The idler 100, as shown in FIGS. 3 and 11, includes an outer ratchet 102 corresponding to and engageable with the inner ratchet 38 of the control member 30. Moreover, the idler 100 includes an inner ratchet 104 corresponding to and engageable with an idler stopper 58 on the base member 50. The size of the inner ratchet 38 of the control member 30 and the outer ratchet 102 of the idler is larger than the size of the inner ratchet 104 of the idler 100 and the idler stopper 58 on the base member 50.

In reference to FIGS. 2 and 11, when the control member 30 is rotated in the winding direction, the first abutment 130 of the control member 30 contacts the first abutment 140 of the ring gear 44. The control member 30 and the ring gear 44 will rotate together in the winding direction to wind the control cable. At the same time, the inner ratchet 38 (shown in FIG. 11) of the control member 30 meshes with the outer ratchet 102 of the idler, causing the control member 30 and the idler 100 to rotate together in the winding direction. The inner ratchet 104 of the idler 100 exceeds one gear pitch and meshes with the idler stopper 58 of the base member 50. The inner ratchet 104 and outer ratchet 102 of the idler 100 are configured such that the outer ratchet 102 rotates together with the control member 30, while the inner ratchet 104 of the idler rotates relative to the base member 50.

When the control member 30 is rotated in a release direction, the second abutment 132 of the control member 30 pushes the return spring 36 toward the second abutment 142 of the ring gear 44, which biases the ring gear 44 in the release direction and pushes abutment 108 on the idler 100. During the releasing operation, the inner ratchet 38 of the control member 30 pushes the outer ratchet 102 of the idler 100 in an axial direction and the inner ratchet 104 of the idler disengages from the idler stopper 58 of the base member 50. When the idler 100 is disengaged from the idler stopper 58, the control member 30, idler 100 and ring gear 44 rotate together one gear pitch of the inner ratchet 104 of the idler 100 in the release direction. The rotation in the release direction results in the releasing of the control cable. Because the size of the inner ratchet 38 and the outer ratchet 102 is larger than the size of the inner ratchet 104 and the idler stopper 58, the control member 30 and the ring gear 44 rotate together.

Figure 4:
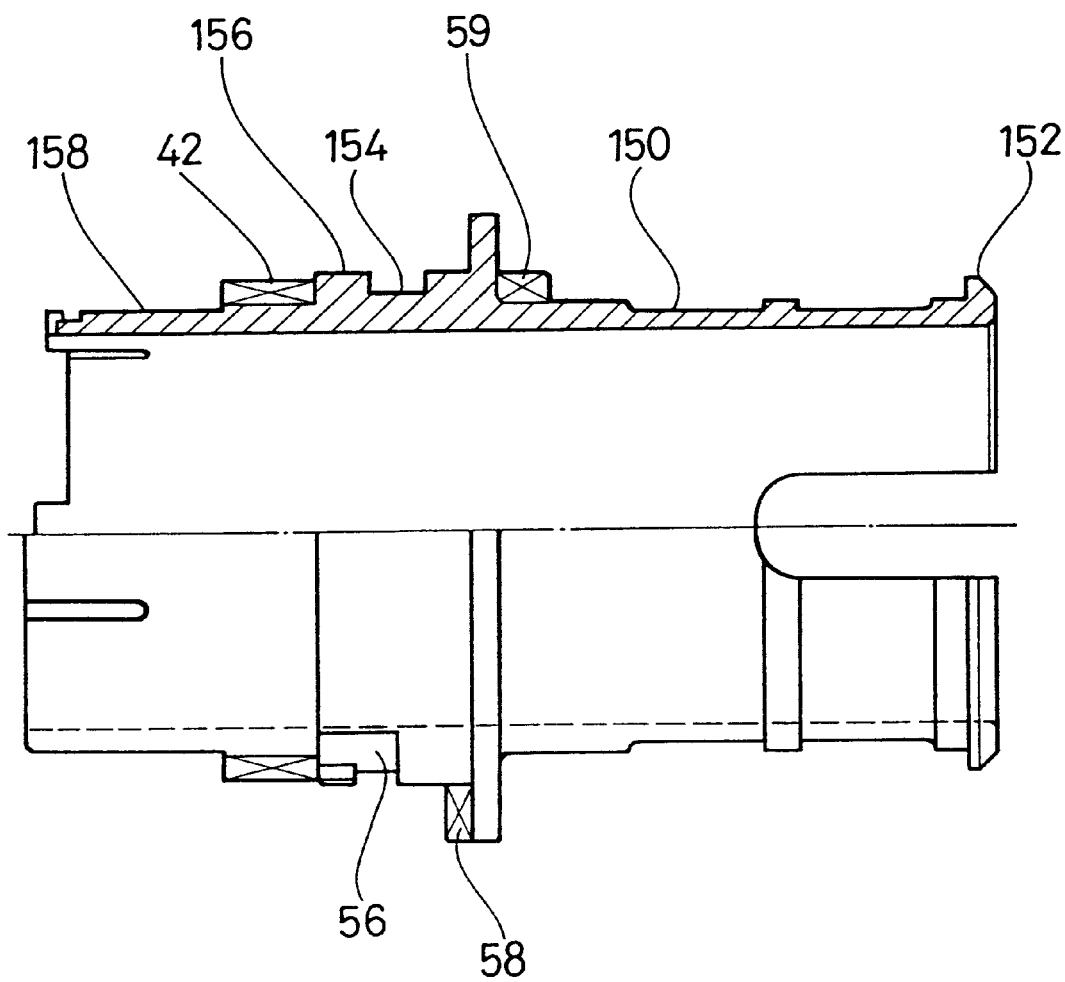
FIG. 4 is a partial cross-sectional side view of the base member of the shift control device of the present invention.

The base member 50 provides a number of guides to ensure proper installation and operation of the components of the shift control device. In a preferred embodiment of the invention, as shown in FIG. 4, the base member 50 is shaped as a long cylinder that fits around the handlebar 12. A restraining projection 152 for restraining the movement of the control member 30 is provided on one end of the cylindrical barrel 150. The base member 50 includes an idler stopper 58 for engagement with the inner ratchet 104 of the idler 100. The base member 50 further includes a limiter 59 that interacts with an inner circumferential depression (not shown) of the control member 30 to define the winding end and the release end of the control member 30.

The stopper plate 120 and wave washer 110 are dimensioned to be fitted in a guide channel 154 of the base member 50. As discussed above, the base member preferably includes an L-shaped groove 56 for receiving the notches 122 on the stop plate 120. To ensure stability of the gear plate 90, the base member 50 includes a gear plate guide 156 upon which the gear plate 90 rotates. Similarly, the base member 50 includes an actuating member guide 158 dimensioned to provide a smooth surface upon which the actuating member rotates. The various guides on the base member 50 ensure that the components of the shift control device 10 remain in the proper position and operate efficiently.

As best shown in FIG. 2, the shift control device is attachable to the handlebar 12 of a bicycle using a shifter bracket 160 and a clamp band 170. The bracket 160 preferably includes channels 162, 164 for receiving the transmission control cable 200 and the second control cable 220, respectively. The clamp band 170 preferably includes a connecting arm 174 that is dimensioned to engage a slit 166 in the shifter bracket 160. The clamp band 170 can be tightly secured to the handlebar using a clamp bolt 172 or other known fastening devices.

Figure 12:
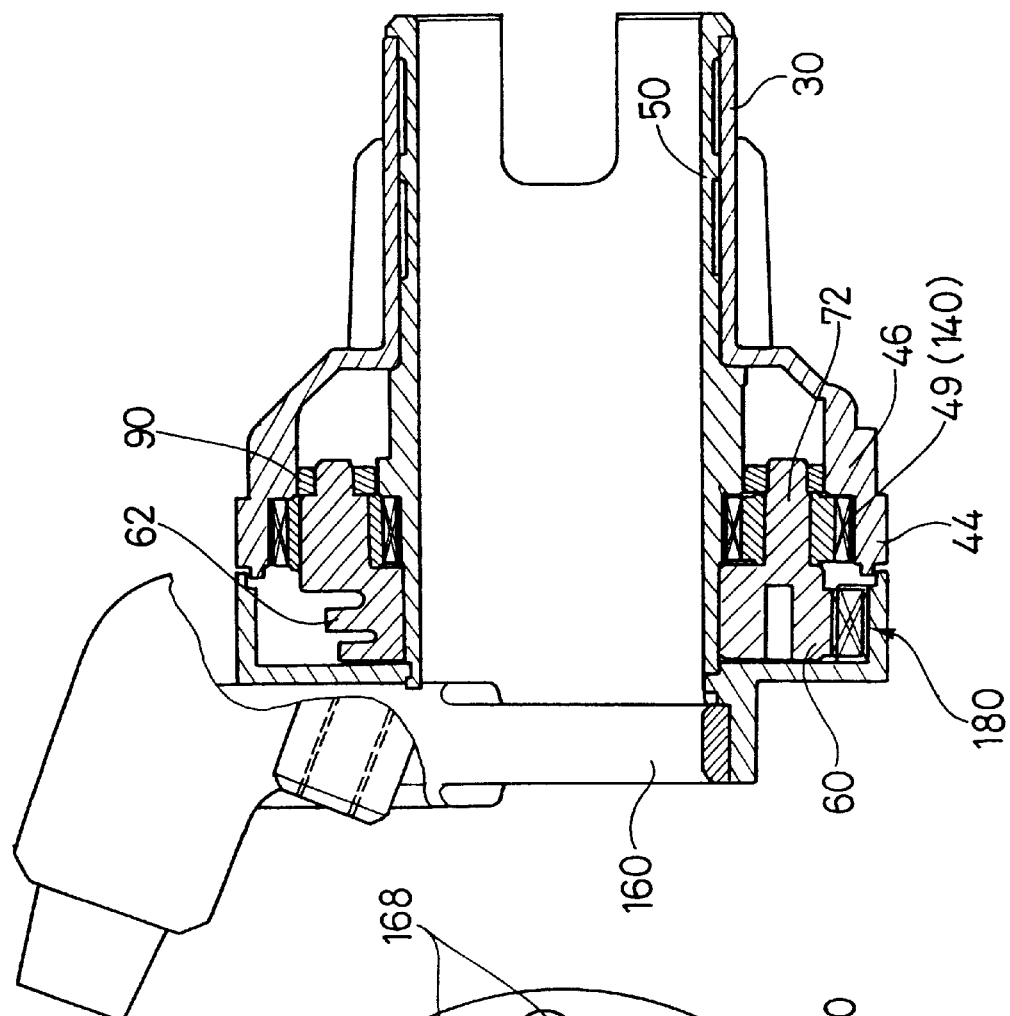
FIG. 12 is a cross-sectional view of another preferred embodiment of the shift control device of the present invention.
Figure 13:
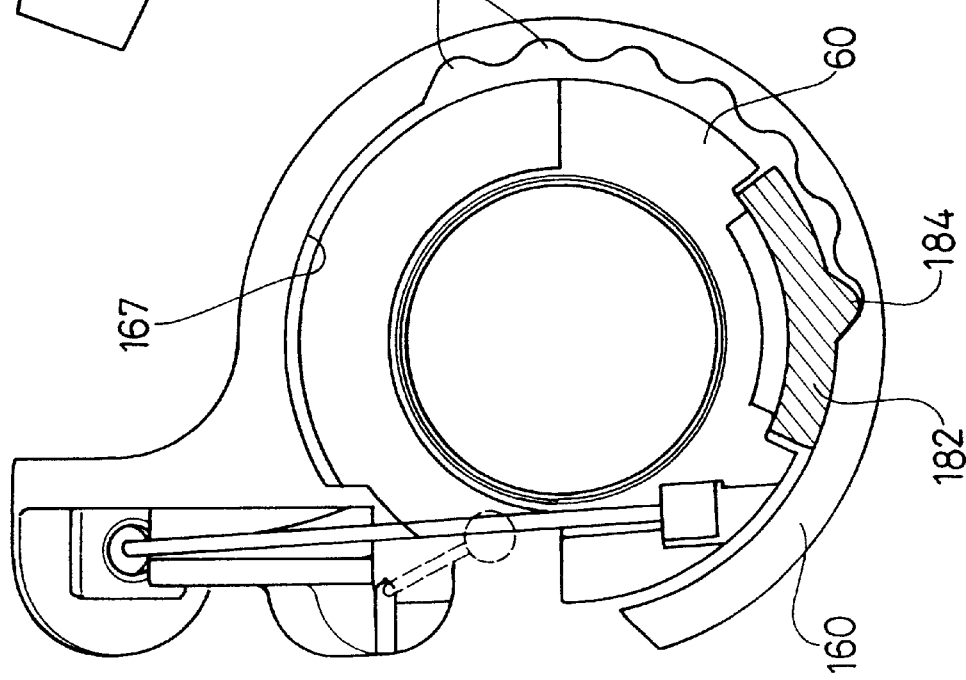
FIG. 13 is a side view of the embodiment of the shift control device shown in FIG. 12.

FIGS. 12 and 13 depict another embodiment of the present invention wherein instead of the idler, an alternate positioning mechanism is used. The components of the shift control device 10 of the embodiment shown in FIGS. 12 and 13 are essentially the same as the components described above, except that the idler element is eliminated and the ratchets and stoppers disposed on the components for engaging the idler are also eliminated. Specifically, as shown in FIG. 12, the shift control device includes a fixed base member 50, a control member 30 coaxially installed on the base member 50. The base member 50 is integrally attached to the ring gear 44. The ring gear 44 includes gears 148 extending radially inward from the circumference of the ring gear 44. The gear teeth correspond to and are dimensioned to engage the gears 49 of the planet gears 46. The rotation of the control member 30 causes the ring gear 44 to rotate which, in turn, rotates the planet gears 46. The planet gears 46 are carried on planet gear shafts 72 that are integrally attached to the actuating member 60. The rotation of the planet gears 46 results in the rotation of the actuating member 60 which turns the winding member 62 that is integral with the actuating member 60. The winding member 62 control the takeup or release of a transmission control cable 200.

The positioning mechanism 180, as best shown in FIG. 13, includes a positioning member 182 having a protruding portion 184 for engagement with one of a plurality of positioning recesses 168 formed on the inside surface 167 of the shifter bracket 160. The actuating member 60 preferably includes a channel 68 therein for receiving the positioning member 182. The positioning member 182 is disposed in the channel 68 of the actuating member 60 such that the rotation of the actuating member 60 results in the movement of the positioning member 182. When the actuating member 60 rotates, the positioning member 182 moves from one positioning recess to an adjacent positioning recess 168.

The positioning recesses 168 are dimensioned to receive the protruding portion 184 of the positioning member 182 and retain the protruding portion 184 therein. The positioning member 182 must be sufficiently resilient to allow the positioning member 182 to move from one positioning recess 168 to another when the control member 30 is rotated. On the other hand, the positioning member must be sufficiently rigid to maintain the position of the positioning member 182, as well as the position of the actuating member 60, when the control member is not being rotated.

The positioning mechanism 180 shown in FIGS. 12 and 13 simplify the design of the shift control device 10 by reducing the number of components. Moreover, the operation of the shift control device is simplified in that there are less gear transitions.

Figure 15:
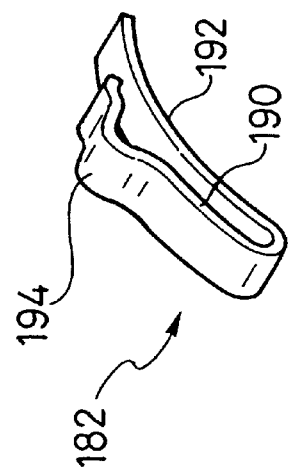
FIG. 15 is a perspective view of a positioning member of the shift control device shown in FIG. 14.
Figure 14:
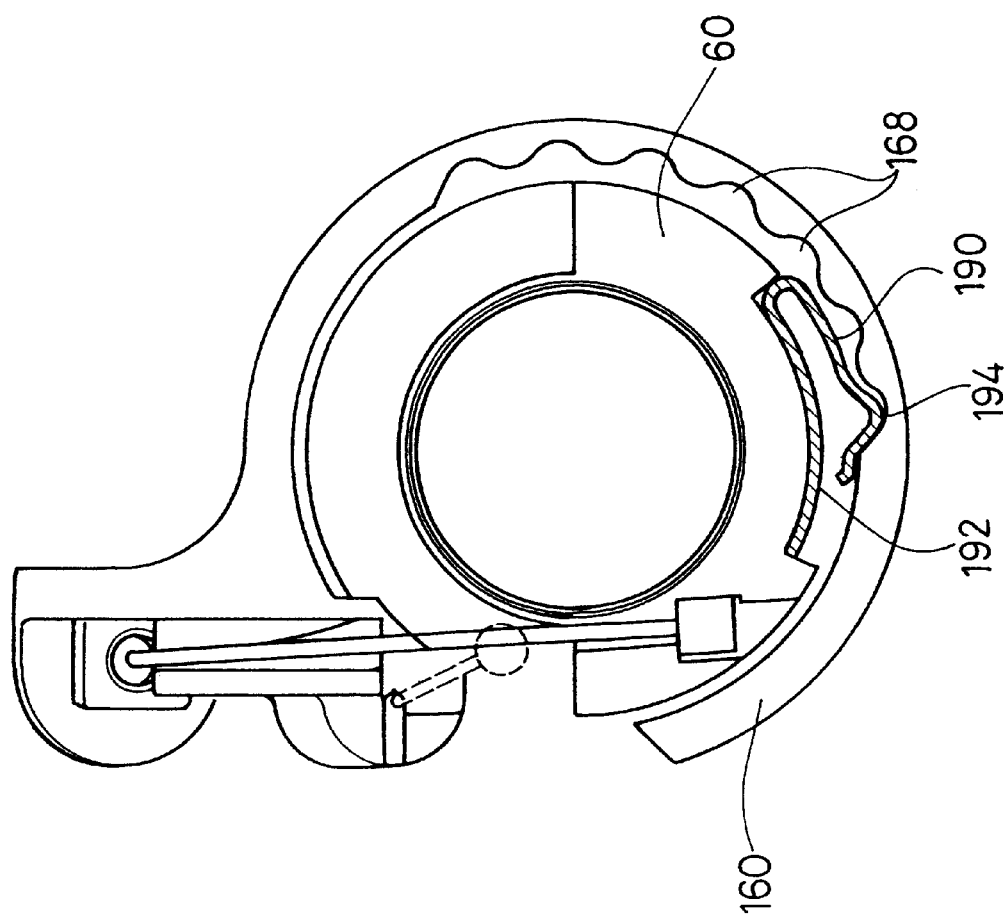
FIG. 14 is a side view of yet another preferred embodiment of the shift control device of the present invention.

In yet another preferred embodiment of the present invention, as shown in FIGS. 14 and 15, the positioning member 182 is made of a resilient strip 190 that is shaped to include a protruding portion 192 and a base portion 194. The base portion 192 is dimensioned to fit in the channel 68 of the actuating member 60. The resilient strip 190 must be sufficiently resilient to allow the positioning member 182 to move from one positioning recess 168 to another when the control member 30 is rotated. On the other hand, the resilient strip 190 must be sufficiently rigid to maintain the position of the positioning member 182, as well as the position of the actuating member 60, when the control member is not being rotated.

The embodiments described above are exemplary embodiments of shift control device for a bicycle having a planetary gear mechanism. Those skilled in the art may now make numerous uses of, and departures from, the above-described embodiments without departing from the inventive concepts disclosed herein. Accordingly, the present invention is to be defined solely by the scope of the following claims.

What is claimed is:

1. A shift control device for a bicycle having a handlebar, comprising:
   a cylindrical base member, not integral with the handlebar, configured to be fixedly secured on the handlebar in a concentric relationship to the handlebar;
   a control member rotatable about the base member;
   an actuating member rotatable about the base member, the actuating member configured to pull and release a transmission control element; and a planetary gear assembly rotatable about the base member and operatively connected to the actuating member, wherein the base member is positioned between the planetary gear assembly and the handlebar.

2. The shift control device of claim 1 wherein the planetary gear mechanism comprises a stationary sun gear, ring gear coaxial with the sun gear, and at least one planet gear revolvable about the sun gear.

3. The shift control device of claim 2 wherein the stationary sun gear is integrally formed on the base member.

4. The shift control device of claim 3 wherein the stationary sun gear is coaxial with the cylindrical base member.

5. The shift control device of claim 2 wherein the sun gear comprises resin.

6. The shift control device of claim 2 wherein the at least one planet gear comprises three planet gears.

7. The shift control device of claim 2 wherein the at least one planet gear comprises five planet gears.

8. The shift control device of claim 2 wherein the actuating member comprises a winding member and a planet carrier.

9. The shift control device of claim 8 wherein the winding member and the planet carrier are integrally formed.

10. The shift control device of claim 8 wherein the planet carrier is integrally formed on the actuating member.

11. The shift control device of claim 8 wherein the winding member comprises two cable grooves.

12. The shift control device of claim 8 wherein the planet carrier comprises at least one planet gear shaft extending therefrom, the at least one planet gear shaft dimensioned to receive the at least one planet gear thereon.

13. The shift control device of claim 12 wherein the at least one planet gear shaft comprises three planet gear shafts.

14. The shift control device of claim 12 wherein the at least one planet gear shaft comprises five planet gear shafts.

15. The shift control device of claim 8 further comprising a gear plate and at least one planet gear shaft, wherein the at least one planet gear is disposed between the gear plate and the planet carrier and is rotatable about the at least one planet gear shaft.

16. The shift control device of claim 15 wherein the at least one planet gear shaft extends from the planet carrier.

17. The shift control device of claim 16 wherein the gear plate is connected to the at least one planet gear shaft.

18. The shift control device of claim 17 wherein the gear plate defines at least one aperture dimensioned to receive the at least one planet gear shaft.

19. The shift control device of claim 15 further comprising a support panel between the gear plate and the planet carrier, the support panel preserving a planet gear space in an axial direction.

20. The shift control device of claim 19 wherein the support panel extends from the planet carrier.

21. A shift control device for a bicycle having a handlebar, comprising:
a cylindrical base member, configured to be fixedly secured on the handlebar in a concentric relationship to the handlebar;
a control member rotatable about the base member;
an actuating member rotatable about the base member, the actuating member configured to pull and release a transmission control element, wherein the actuating member comprises a winding member and a planet carrier;
a planetary gear assembly rotatable about the base member and operatively connected to the actuating member, wherein the planetary gear mechanism comprises a stationary sun gear, ring gear coaxial with the sun gear, and at least one planet gear revolvable about the sun gear;
a gear plate and at least one planet gear shaft, wherein the at least one planet gear is disposed between the gear plate and the planet carrier and is rotatable about the at least one planet gear shaft; and
a support panel between the gear plate and the planet carrier, the support panel preserving a planet gear space in an axial direction, wherein the support panel extends from the planet carrier, and wherein the support panel comprises a tip portion corresponding to a tip portion aperture defined in the gear plate.

22. The shift control device of claim 1 further comprising a shifter housing encompassing the actuating member and an electrical switch positioned on the housing.

23. The shift control device of claim 2 wherein the ring gear further comprises a gear position indicator.

24. The shift control device of claim 2 wherein the control member rotates the ring gear.

25. The shift control device of claim 1 further comprising a detent mechanism operatively connected to the actuating member.

26. The shift control device of claim 25 wherein the detent mechanism comprises an idler disposed between the planetary gear assembly and the control member.

27. The shift control device of claim 1 further comprising two gear indicators operatively connected to the actuating member.

28. The shift control device of claim 27 further comprising a housing encompassing the actuating member and an electric switch positioned on the housing.

29. The shift control device of claim 8 wherein the planetary carrier comprises resin.

30. The shift control device of claim 15 wherein the gear plate comprises resin.

31. A shift control device, comprising:
a base member
a control member rotatable about the base member;
an actuating member rotatable about the base member;
a planetary gear assembly operatively connected to the control member and the actuating member; and
a positioning mechanism located at least partially between the control member and the planetary gear assembly, wherein the positioning mechanism moves between an engagement position in which the positioning mechanism engages the control member and a disengagement position in which the positioning member is disengaged from the control member.

32. The shift control device of claim 31 wherein the planetary gear mechanism comprises a stationary sun gear, ring gear coaxial with the sun gear, and at least one planet gear revolvable about the sun gear.

33. The shift control device of claim 32 wherein the sun gear is integrally formed on the cylindrical base member.

34. The shift control device of claim 32 wherein the actuating member comprises a winding member and a planet carrier.

35. The shift control device of claim 34 wherein the planet carrier comprises at least one planet gear shaft extending therefrom, wherein the at least one planet gear shaft is dimensioned to receive a planet gear thereon.

36. The shift control device of claim 34 further comprising a gear plate and at least one planet gear shaft, wherein the at least one planet gear is disposed between the gear plate and the planet carrier and is rotatable around the at least one planet gear shaft.

37. The shift control device of claim 36 wherein the gear plate is connected to the at least one planet gear shaft.

38. The shift control device of claim 32 further comprising a gear position indicator on the ring gear.

39. The shift control device of claim 32 wherein the control member rotates the ring gear.

40. The shift control device of claim 32 wherein the at least one planet gear comprises three planet gears.

41. The shift control device of claim 32 wherein the at least one planet gear comprises five planet gears.

42. The shift control device of claim 32 wherein the actuating member comprises a plurality of planet gear shafts extending therefrom, wherein each planet gear shaft is dimensioned to receive a planet gear thereon.

43. A shift control device, comprising:
a base member;
a control member rotatable about the base member;
an actuating member rotatable about the base member;
a planetary gear assembly operatively connected to the control member and the actuating member, wherein the planetary gear assembly comprises a stationary sun gear, ring gear coaxial with the sun gear, and at least one planet gear revolvable about the sun gear, wherein the actuating member comprises a plurality of planet gear shafts extending therefrom, wherein each planet gear shaft is dimensioned to receive a planet gear thereon, and wherein the actuating body comprises a plurality of support panels, each support panel positioned between two planet gear shafts; and
a positioning mechanism located at least partially between the control member and the planetary gear assembly.

44. The shift control device of claim 31 wherein the positioning mechanism comprises an idler.

45. A shift control device, comprising:
a base member;
a control member rotatable about the base member;
an actuating member, having an actuating member axis, the actuating member rotatable about the base member about the actuating member axis;
a planetary gear assembly operatively connected to the control member and the actuating member, the planetary gear assembly having a sun gear and at least two planetary gears, each planetary gear having a planetary gear axis about which the planetary gear rotates, wherein the planetary gear axis is substantially parallel to the actuating member axis; and
a positioning mechanism operatively connected to the base member, wherein the positioning mechanism moves between an engagement position in which the positioning mechanism engages the control member and a disengagement position in which the positioning member is disengaged from the control member.

46. The shift control device of claim 45 wherein the positioning mechanism is an idler.

47. The shift control device of claim 45 wherein the positioning mechanism comprises a position retaining member and a bracket having a plurality of positioning recesses therein, and wherein the position retaining member limits the rotation of the actuating member by engaging one of the plurality of the positioning recesses.

48. The shift control device of claim 47 wherein the position retaining member comprises a resilient strip.

49. The shift control device of claim 48 wherein the resilient strip comprises metal.

50. The shift control device of claim 45 further comprising a gear plate secured to the actuating member in a manner that preserves the axial spacing between the planet gears.

51. The shift control device of claim 45 wherein the actuating member includes at least one support panel configured to preserve the axial spacing between the planet gears.

52. A shift control device, comprising:
a fixed base member having a base member axis;
a control member rotatable about the base member and rotatable about the base member axis;
an actuating member rotatable about the base member and rotatable about the base member axis;
a ring gear rotatable with the control member;
a sun gear disposed on the base member; and
a planet gear engageable with the ring gear and the sun gear and configured to rotate the actuating member.

53. A shift control device attachable to a bicycle handlebar, comprising:
a base member configured to be secured concentrically to the handlebar;
a stationary sun gear disposed on the base member;
a control member rotatably mounted relative to the base member;
a ring gear operatively engaged with the control member;
an actuating body having a plurality of planet carriers, wherein each planet carrier carries a respective planet gear, and wherein the planet gears engage the ring gear and the sun gear in a manner that rotates the actuating body; and
wherein the control member drives the ring gear and the planet gears rotate about the stationary sun gear.

54. A method of rotating a winding member, comprising the steps of:
providing a stationary handlebar, a base member fixedly connected to and not integral with the handlebar, a control member, a gear assembly and a winding member in a concentric relationship to each other, wherein the gear assembly operatively engages the handlebar, control member and winding member, and wherein the base member is positioned between the gear assembly and the handlebar;
varying the relative angular position between the winding member and the stationary handlebar by rotating the control member; and
wherein the angular rotation for the winding member is smaller than the angular rotation of the control member.

55. A bicycle shifter assembly, comprising:
a non-movable base member having a base axis;
a stationary sun gear integrally attached to the base member in a radially outward direction;
a control member rotatably mounted relative to the base member and rotatable about the base axis;
a ring gear operatively engaged with the control member;
an actuating body having a plurality of planet carriers, wherein each planet carrier carries a respective planet gear, and wherein the planet gears engage the ring gear and the sun gear in a manner that rotates the actuating body;

wherein the control member drives the ring gear and the planet gears rotate about the stationary sun gear; and an idler operatively engaging the base member, the control member and ring gear and controlling the rotation of the ring gear in relation to the base member.

56. A bicycle shifter assembly, comprising:

a stationary handlebar;

a base member fixedly connected to and not integral with the handlebar;

a control member rotatable about the base member;

an actuating member rotatable about the base member; and a planetary gear assembly operatively connected to the control member and the actuating member, wherein the control member drives the planetary gear assembly which rotates about the base member, and wherein the base member is positioned between the planetary gear assembly and the handlebar.

* * * * *